3,667,907
MANUFACTURE OF HYDROGEN CYANIDE
John Derek Rushmere, Wilmington, Del., assignor to
E. I. du Pont de Nemours and Company, Wilmington, Del.
No Drawing. Filed May 4, 1970, Ser. No. 34,577
Int. Cl. C01c 3/02
U.S. Cl. 23—151       4 Claims

ABSTRACT OF THE DISCLOSURE

An improvement in the Andrussow process for the manufacture of hydrogen cyanide is provided. The improvement comprises the use of steam in the synthesis mixture in place of nitrogen which is present in air. Preferably, a synthesis mixture containing by volume methane/ammonia/steam/oxygen within the range of 1–2:1:1:1 to 1–2:1:4:1 is employed.

BACKGROUND OF THE INVENTION

Field of invention

This invention relates to processes for the production of hydrogen cyanide, and more particularly to gas phase processes for the production of hydrogen cyanide by the use of a gaseous reaction mixture of a gaseous hydrocarbon, ammonia, oxygen and steam.

Prior art

Hydrogen cyanide is a very useful chemical which finds application in the preparation of numerous, widely varied products. The extensive growth in demand for this chemical necessitates continuing innovation and improvement in the processes for its manufacture which are more economical than the existing process.

One such commercial process involves the catalytic conversion of ammonia, a gaseous hydrocarbon and air using a platinum or platinum alloy as the catalyst. This process is disclosed by Andrussow in U.S. Pat. 1,934,838 issued Nov. 14, 1933, and Jenks in U.S. Pat. 3,104,945 issued Sept. 24, 1963, has been quite efficient and has produced hydrogen cyanide in good yield. However, in view of the general growth of hydrogen cyanide, there is a continuing need to improve the efficiency of the manufacturing process.

SUMMARY OF THE INVENTION

According to the present invention there is provided a process for the manufacture of hydrogen cyanide by the vapor phase reaction between oxygen, ammonia and a gaseous hydrocarbon over a catalyst chosen from the platinum metals, the improvement comprising mixing said reactants with steam prior to the reaction.

DETAILED DESCRIPTION OF THE INVENTION

The Andrussow process for the manufacture of hydrogen cyanide is well known, and is usually commercially conducted by contacting a gaseous synthesis mix containing methane, ammonia and air with a platinum metal catalyst at an elevated temperature, usually in excess of 1000° C. This gas mixture undergoes partial combustion to generate heat required for the endothermic synthesis of hydrogen cyanide in an overall reaction expressed as:

$$CH_4 + NH_3 + \tfrac{3}{2}O_2 = HCN + 3H_2O$$

The reaction is conducted ideally in an adiabatic manner.

The present invention is an improvement to the above-described Andrussow process in that in the reaction mixture containing a gaseous hydrocarbon, ammonia, steam and oxygen, less steam may be present as diluent than the nitrogen derived from air. Such a mixture then offers an increase in hydrogen cyanide production using the same total gas flow rates as is used with the current mixture. Also, the proportion of the by-product hydrogen in the off gases is increased and can be more readily separated due to the condensible nature of the diluent steam compared to the noncondensible nitrogen from the air. The reaction mixture fed to the reaction zone preferably contains by volume methane/ammonia/steam/oxygen within the range of 1–2:1:1:1 to 1–2:1:4:1, most preferably a ratio of 1:1:2–3:1.

Although methane is the preferred hydrocarbon because of its ready availability, good reactivity, and advantageous economics, numerous other normally gaseous hydrocarbons are also useful in the process. These include saturated hydrocarbons such as ethane, propane and the butanes, and unsaturated hydrocarbons such as ethylene, propylene, acetylene and mixtures of these compounds. Generally, any normally gaseous hydrocarbon containing up to 6 carbon atoms per molecule can be used. Normally liquid hydrocarbons such as pentane, hexane, cyclohexane and benzene can also be utilized by first converting them to vapor in a suitable apparatus.

The catalyst used in the Andrussow process is chosen from the platinum metals and is preferably a platinum-rhodium alloy containing up to 20 percent by weight rhodium. It is preferred that the catalyst be in the form of a gauze or layers of gauze.

The invention will be further understood by the following examples in which parts and percentages are by weight unless otherwise indicated. In the examples, all gas volumes are given at standard temperature and pressure conditions.

EXAMPLES 1 TO 6

A reaction converter consisting of a nominal 1″ diameter quartz reaction tube was inserted vertically in a 6″ tube furnace, which was required to minimize heat losses to the converter walls. The catalyst bed consisting of 20 layers of 80-mesh Pt-10% Rh gauze was positioned laterally across the converter tube in the middle of the furnace. Positioned immediately above the converter was a preheater-steam generator comprising a section of 1″ quartz tube packed with a 6″ high column of quartz chips, the whole being heated electrically to about 350° C. The synthesis gases were admitted to this preheater at predetermined flow rates (cc./min.). Steam was generated as required by dripping water onto the heated quartz chips at a controlled rate from a micropump. Reaction temperature was measured by means of a thermocouple resting on top of the catalyst bed. Ammonia and hydrogen cyanide were recovered from the off gases by scrubbing in successively 1 M $H_2SO_4$ and 5 M NaOH. Conversions and yields were calculated using $$\text{Percent } NH_3 \text{ conversion} = \frac{(NH_3 \text{ in} - NH_3 \text{ out})}{NH_3 \text{ in}} \times 100$$

$$\text{Percent HCN yield} = \frac{HCN \text{ out}}{(NH_3 \text{ in} - NH_3 \text{ out})} \times 100$$

Flow rates, temperatures, conversion and yield are shown in Table I.

TABLE I

| Example No. | Flow rates (cc./min.) | | | | T₀ (° C.) | T₁ (° C.) | T₂ (° C.) | Percent NH₃ conversion | Percent HCN yield |
| --- | --- | --- | --- | --- | --- | --- | --- | --- | --- |
| | CH₄/NH₃ | Air | O₂ | Steam | | | | | |
| Control | 237/231 | 1,035 | | | | 1,250 | No | 40 | 49 |
| Do | 237/231 | 1,035 | | | | 1,250 | 320 | 44 | 49 |
| Do | 237/231 | 1,035 | | | | 1,250 | No | 41 | 40 |
| Do | 237/231 | 1,100 | | | 1,200 | 1,077 | 500 | 88 | 29 |
| Do | 212/231 | 1,100 | | | 1,200 | 1,025 | No | 94 | 9 |
| 1 | 237/231 | | 200 | 740 | | 1,250 | 350 | 54 | 36 |
| 2 | 237/231 | | 200 | 1,000 | | 1,250 | 350 | 65 | 38 |
| 3 | 237/231 | | 200 | 1,334 | | 1,250 | 350 | 78 | 34 |
| 4 | 237/231 | | 200 | 3,700 | | 1,000 | 350 | 41 | 57 |
| 5 | 237/231 | | 180 | 408 | 1,080 | 920 | 350 | 35 | 60 |
| 6 | 237/231 | | 180 | 408 | 1,200 | 1,150 | 350 | 70 | 21 |
| Control | 212/231 | 1,100 | | | 1,200 | 660 | 426 | 50 | 35 |

T₀=furnace temperature; T₁=reaction temperature; T₂=preheater temperature.

What is claimed is:

1. In the manufacture of hydrogen cyanide by the vapor phase reaction between oxygen, ammonia and a gaseous hydrocarbon over a catalyst chosen from the platinum metals, the improvement comprising mixing said reactants with steam prior to the reaction, the volume ratio of the reactant mixture being within the range of 1–2:1:1:1 and 1–2:1:4:1 of gaseous hydrocarbon/ammonia/steam/oxygen.

2. The process of claim 1 wherein the gaseous hydrocarbon is methane.

3. The process of claim 2 wherein the catalyst is in the form of a gauze consisting of a platinum-rhodium alloy containing up to 20 percent by weight rhodium.

4. The process of claim 3 wherein the volume ratio of the reactant mixture is about 1:1:2–3:1.

References Cited

UNITED STATES PATENTS 1,934,838  11/1933  Andrussow  23—151
1,982,407  11/1934  Wheeler  23—151

OSCAR R. VERTIZ, Primary Examiner

H. S. MILLER, Assistant Examiner